No. 864,698. PATENTED AUG. 27, 1907.
G. W. SCHOCK & L. A. MATTES.
CONCRETE BLOCK MACHINE.
APPLICATION FILED SEPT. 19, 1906.
2 SHEETS—SHEET 1.
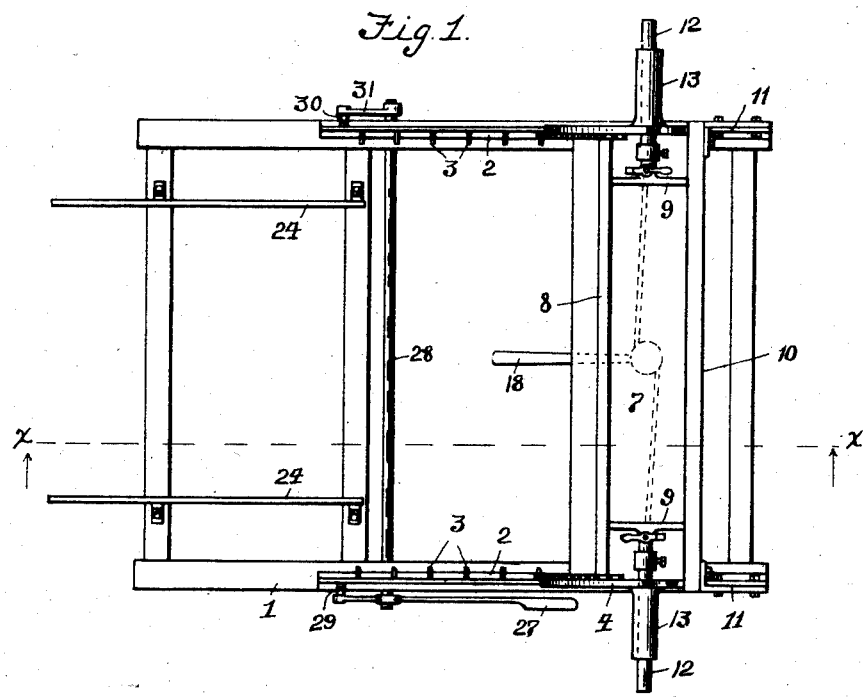
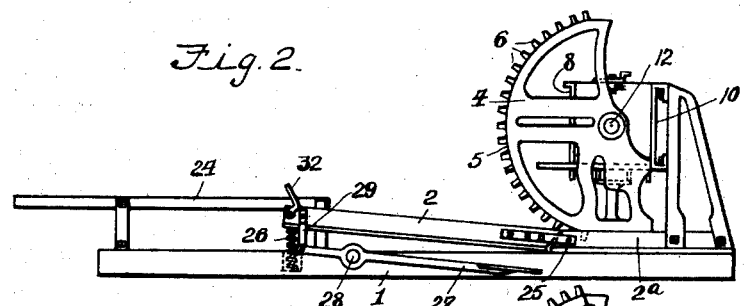
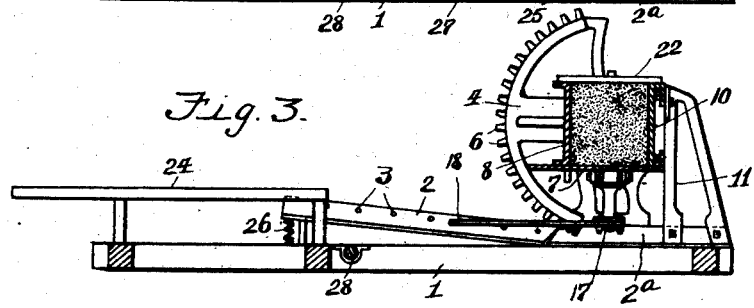
Witnesses:
George Oltsch
G. M. Cole
Inventors.
George W. Schock
Leopold A. Mattes
By Theo. Lose Dalton
Atty.

No. 864,698. PATENTED AUG. 27, 1907.
G. W. SCHOCK & L. A. MATTES.
CONCRETE BLOCK MACHINE.
APPLICATION FILED SEPT. 19, 1906.

2 SHEETS—SHEET 2.

Witnesses:
George Oltsch
G. M. Cole

Inventors:
George W. Schock
Leopold A. Mattes
By Theodore Dalton
Atty.

UNITED STATES PATENT OFFICE.

GEORGE W. SCHOCK AND LEOPOLD A. MATTES, OF SOUTH BEND, INDIANA.

CONCRETE-BLOCK MACHINE.

No. 864,698.      Specification of Letters Patent.      Patented Aug. 27, 1907.

Application filed September 19, 1906. Serial No. 335,255.

*To all whom it may concern:*

Be it known that we, GEORGE W. SCHOCK and LEOPOLD A. MATTES, citizens of the United States, residing at South Bend, in the county of St. Joseph and State of Indiana, have invented certain new and useful Improvements in Concrete-Block Machines, of which the following is a specification.

This invention relates to concrete block machines.

An object of the invention is to provide an improved machine which will turn the mold after the block has been formed and deposit the block upon a suitable support from which the block may afterwards be removed.

Other and further objects will appear in the following description and will be more particularly pointed out in the claims.

Figure 4:
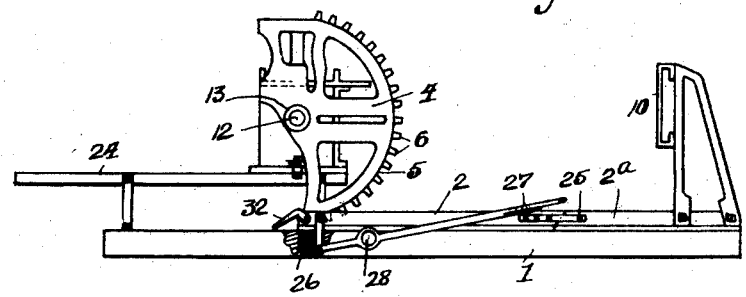
Figure 5:
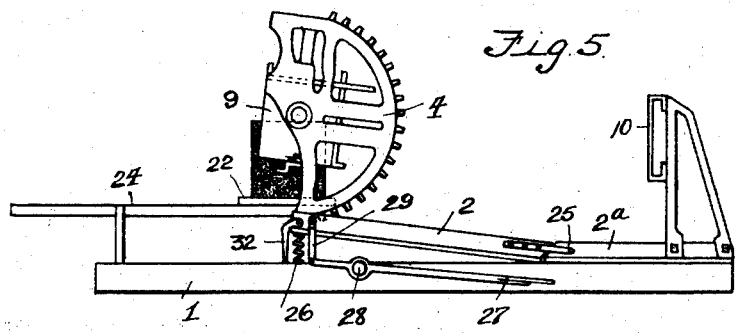
Figure 6:
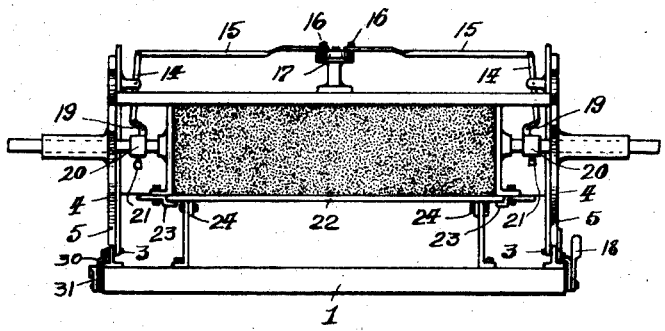

In the drawings:—Figure 1 is a plan view of my invention. Fig. 2 is a side elevation with the mold in position to be filled. Fig. 3 is a longitudinal vertical section on line $x$—$x$ of Fig. 1. Fig. 4 is a side elevation the mold being moved to the support. Fig. 5 is a like view, the mold being shown shortly after it leaves the block, and Fig. 6 is a rear view of the machine in the position shown in Fig. 4.

Referring more particularly to the drawings 1 indicates a base frame of any suitable construction.

Supported upon the base frame is a pair of tracks 2 having on their opposed faces a plurality of spaced projections or teeth 3. A rolling mold carrying member is mounted on these tracks and comprises a pair of sectors 4, and the mold proper. The sectors have their peripheries provided with a smooth surface 5 to roll on the tracks 2 and with teeth 6 to engage teeth 3 on the tracks. The mold comprises a bottom 7 and a side 8 rigidly secured to the sectors 4, two ends 9 movable axially of the sectors toward and from each other, and a side member 10 supported by uprights 11 in a vertical position, on the base frame 1. The ends 9 have guide rods 12 extending therefrom and working in tubes 13 on the sectors. Any suitable means may be employed for moving the ends. The means shown comprises levers 14 pivoted intermediate of their ends to the sectors and each connected at one of its ends to a mold end and at its other end to a rod 15.

The rods 15 are connected to eccentric pins 16 on a disk 17 rotatably mounted on the bottom of the mold. It is apparent that when the disk 17 is rotated in one direction by means of lever 18, the ends of the mold will be moved away from the block and that when said disk is rotated in the other direction the ends of the mold will be moved to their normal positions. So that the normal positions of the mold ends may be changed to make blocks of different lengths the ends of the levers 14 are connected to the mold ends by means of links 19 which are in turn connected to collars 20 adjustably mounted upon the guides 12 and held in the positions to which they are adjusted, by means of set screws 21.

The mold is filled while the parts are in position shown in Figs. 1 and 2. After being filled and tamped, the top 22 is fitted to the mold and secured in place by latches 23. The mold carrying frame is now shifted so that the top of the mold lies upon a block support 24 at the opposite end of the base frame 1. Latches 23 are moved to release the top 22, and lever 18 is turned to shift the mold ends away from the block. The mold and mold carrying frame are now elevated. This is accomplished by the following means:

The rails or tracks 2 have their rear end portions $2^a$ pivoted at 25, the free rear ends of said portions being held elevated by springs 26 located beneath said portions. These springs, while not strong enough to elevate the pivoted rail portions when the mold carrier is located thereon, are employed for assisting in the elevation. The elevation of the rails, and consequently of the mold carrier and the mold, is accomplished by means of a treadle 27 secured intermediate of its ends to a rock shaft 28 and connected at its rear end to a link 29 which in turn is connected to one of the track sections $2^a$, so that a depression of the treadle will elevate said track section. The other track section is elevated simultaneously with this track section by means of link 30 secured to an arm 31 extending from rock shaft 28 which is operated by the treadle.

When the mold carrier has been elevated by the above described means, it is held in this position by a dog 32 pivoted to one of the pivoted rail sections and acting as a prop therefor. The block is then conveyed to any suitable place to dry and the mold carrier is returned to its original position so that the mold may be refilled.

In increasing or decreasing the length of the mold all the members forming the mold are employed except the top. The width of the mold is changed by shifting the side 8.

Having thus described my invention, what I claim and desire to secure by Letters Patent is:—

1. The combination with the base frame, of tracks on the base frame, a support for the molded block near one end of the tracks, a rolling mold movable on the tracks, and means for elevating the mold relatively to the support to discharge the mold on the support.

2. The combination with the base frame, of tracks on the base frame, a support for the completed block near one end of the tracks, a mold side rigidly secured to the base frame near the other end of the tracks and a mold carrying sectors turning on the tracks from the rigidly secured mold side to the support.

3. The combination with the rolling mold carrier, and the support, of means for elevating said carrier relatively to the support.

4. The combination with the base frame, of toothed tracks thereon, toothed sectors rolling on the tracks, a mold carried by the toothed sectors and rolling with the same, and means for elevating portions of the tracks to elevate the molds and the sectors.

5. The combination with the tracks, of a mold carrier rolling on the tracks and a mold rolling with the carrier, and means for elevating portions of the tracks to elevate the mold carrier and the mold.

6. The combination with a molded block support, of tracks leading from said support, means for elevating portions of the tracks, and a mold rolling on said tracks.

7. The combination with a base frame, of a mold side rigidly secured to the base frame, a pair of sectors rolling on the base frame, a mold side and a mold bottom connecting the sectors, and mold ends having sliding connection with the sectors.

8. The combination with the sectors having tubes extending therefrom, of a mold carried by said sectors and having movable ends provided with rods guided in the tubes.

9. The combination with the base frame, of tracks thereon, a molded-block support near each end of the tracks, a mold side rigidly secured near the other end of the track, a pair of sectors rolling on the tracks, a mold bottom and a mold side carried by the sectors, mold ends also carried by the sectors, means for simultaneously shifting the mold ends, and means for elevating the mold when the latter has deposited a block upon the support.

In testimony whereof we have signed our names to this specification in the presence of two subscribing witnesses.

GEORGE W. SCHOCK.
LEOPOLD A. MATTES.

Witnesses:
GEORGE OLTSCH,
G. M. COLE.